(No Model.) 3 Sheets—Sheet 1.

A. M. BACON.
GLASS MELTING FURNACE.

No. 512,792. Patented Jan. 16, 1894.

WITNESSES
INVENTOR
Addison M. Bacon

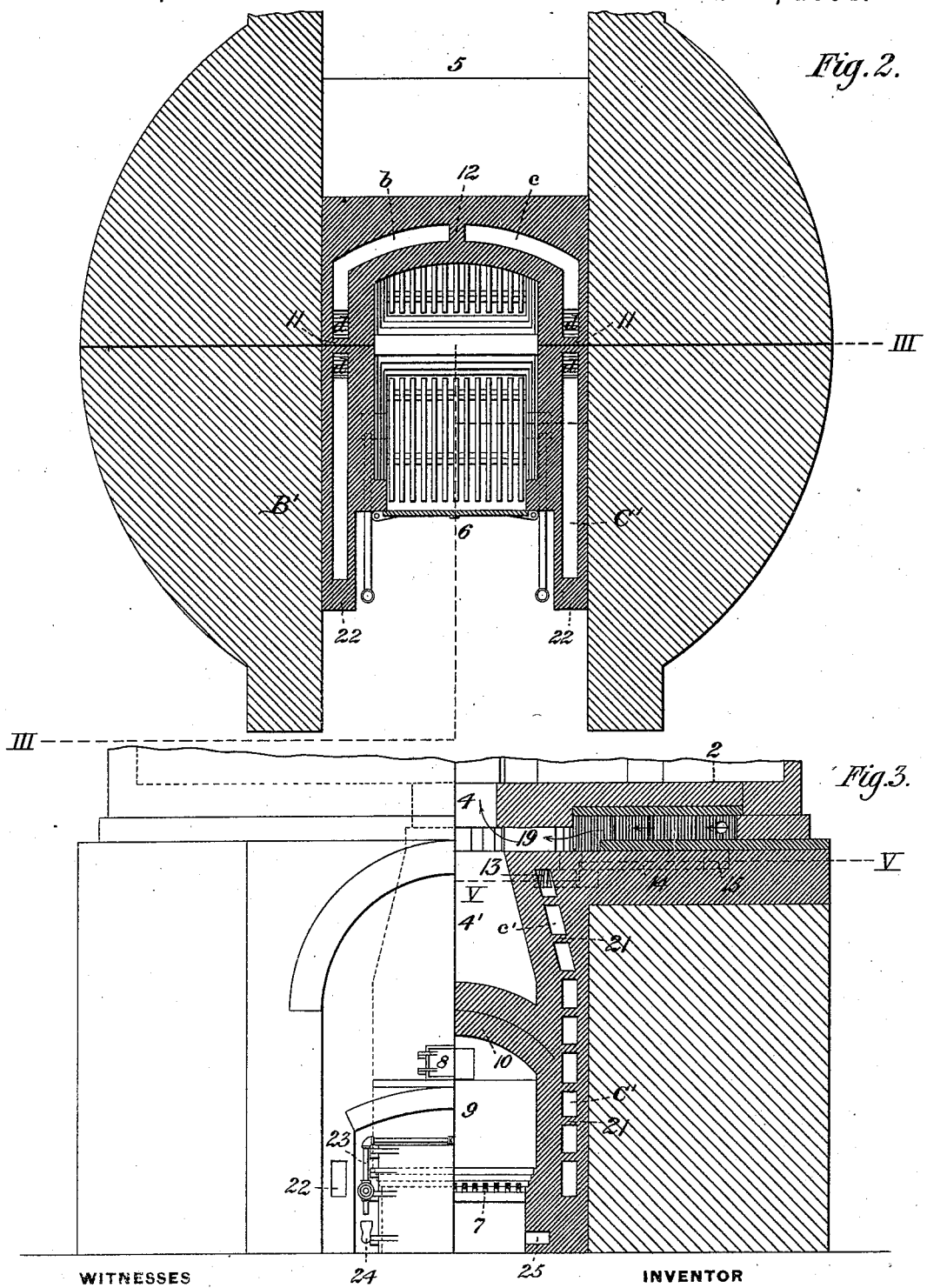

(No Model.) 3 Sheets—Sheet 3.

A. M. BACON.
GLASS MELTING FURNACE.

No. 512,792. Patented Jan. 16, 1894.

WITNESSES
Thomas W. Bakewell
O. M. Clarke

INVENTOR
Addison M. Bacon

UNITED STATES PATENT OFFICE.

ADDISON M. BACON, OF PITTSBURG, PENNSYLVANIA.

GLASS-MELTING FURNACE.

SPECIFICATION forming part of Letters Patent No. 512,792, dated January 16, 1894.

Application filed September 1, 1892. Serial No. 444,791. (No model.)

*To all whom it may concern:*

Be it known that I, ADDISON M. BACON, of Pittsburg, in the county of Allegheny and State of Pennsylvania, have invented a new and useful Improvement in Glass-Melting Furnaces, of which the following is a full, clear, and exact description, reference being had to the accompanying drawings, in which—

Figure 1:
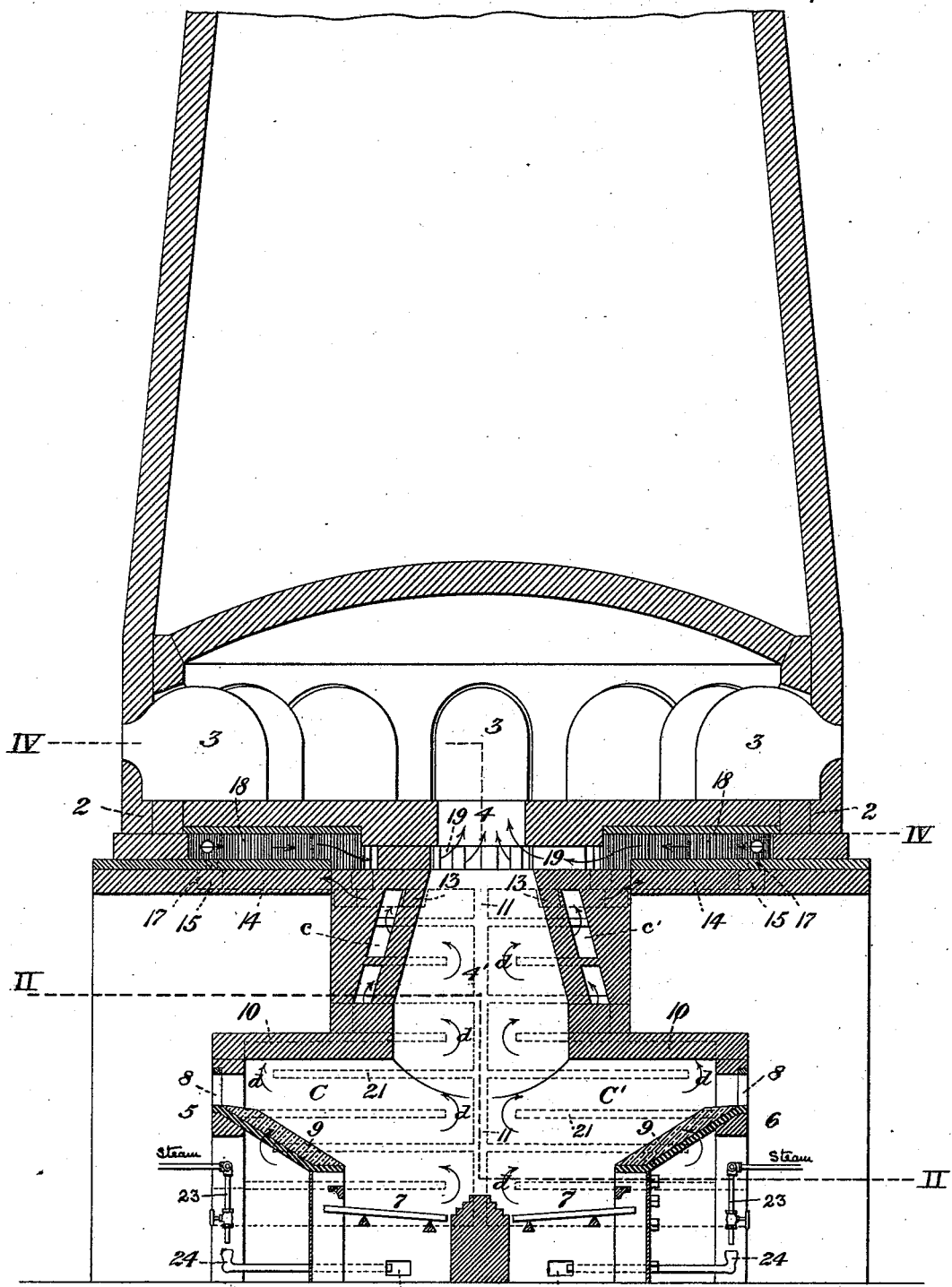
Figure 4:
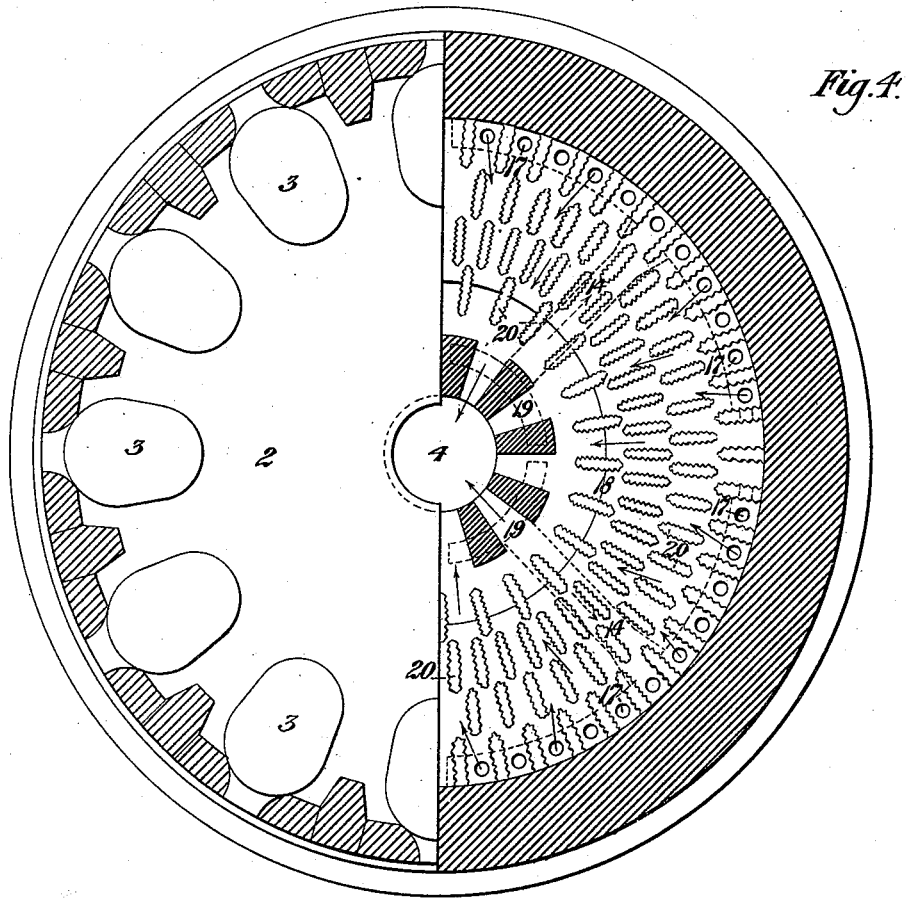
Figure 5:
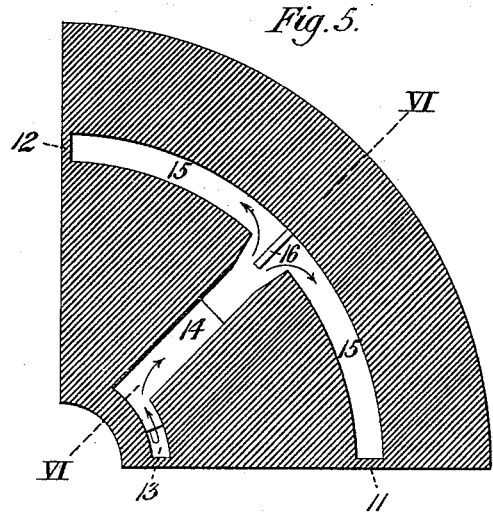
Figure 6:
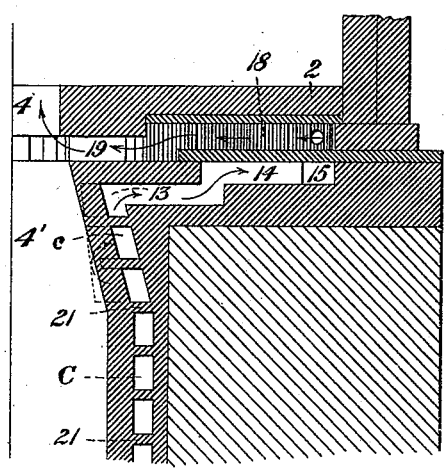

Figure 1 is a vertical central section of a glass melting furnace and its combined producer, constructed in accordance with my invention. Fig. 2 is a horizontal section on the irregular line II—II of Fig. 1; the half of the figure at the upper part of the sheet being taken in section at a higher level than is the lower half. Fig. 3 is a view, one-half of which shows in front elevation the lower part of the apparatus, while the other half is in vertical section on the line III—III of Fig. 2. Fig. 4 is a horizontal section on the irregular line IV—IV of Fig. 1, one-half of the figure being taken in section on the plane of the horizontal air-flue directly beneath the bench of the furnace, and the other half being in section at the level of the melting-pots, showing the latter in plan view. Fig. 5 is a horizontal section on the line V—V of Fig. 3; and Fig. 6 is a vertical section on the line VI—VI of Fig. 5.

Like symbols of reference indicate like parts in each of the views.

The object of my invention is to simplify the construction and improve the operation of glass-melting furnaces, in which the furnace and its fuel-supplying apparatus or producer are built together to constitute a single structure.

In the drawings 2 represents the bench of a furnace containing a series of glass-melting pots 3 set on the bench in the usual manner.

4 is the central eye of the furnace through which the fuel-gas by which the furnace is heated is discharged thereinto. It serves as the discharge-passage from the well 4' of the furnace, which is also the throat of a gas-producing apparatus. This comprises two producer-chambers 5, 6, in direct communication with each other and with the furnace-eye. Each producer-chamber has a set of fuel-supporting grate-bars 7, a fuel-charging door 8, and an inclined chute or floor 9 leading downward from the door 8. The chambers 5, 6, together constitute an oblong structure covered by an arch 10, and this is surmounted directly by the annular wall of the vertical well 4', which may be of circular form in cross-section, and which discharges directly into the eye 4. The masonry of the well 4' is, however, built independently of the producer arch, and it is self-supporting, made so that the producer may be torn out for the purpose of repairing or rebuilding without destroying the integrity of the structure of the well.

The air, by which combustion of the furnace gas is effected, is introduced into the furnace through a series of flues formed in the walls of the producer, and its throat, and by passing through said flues becomes heated to a high temperature, so that on emerging therefrom it will be in the best condition for effecting thorough combustion. The sides of the producer-chamber and the circular wall of the throat 4' are made hollow, forming vertical air-spaces. These are divided by vertical side walls 11, two of which are shown in Fig. 2, and one by dotted lines in Fig. 1. The parts of the air-space within the wall of the throat 4' are further subdivided by vertical end-walls 12, into two parts $b$, $c$, or $b'$, $c'$, each communicating directly with the air space B, C, or B', C', in the side of the producer-chamber just below. There are, therefore, four vertical air heating spaces B $b$, C $c$, B' $b'$, and C' $c'$, each one of these spaces forming a jacket in one-half of one side of the producer-chamber, and in one-quarter of the wall of the throat 4'. Each of these four flues communicates at the top through a port 13 with an outwardly and radially extending flue 14, situate under the furnace-bench, which flue, at its outer end communicates with a circular flue 15, a vertical partition brick 16 at the middle of the latter dividing it into two parts and causing the air current to go equally to both sides of the partition. The several flues 15 communicate, through vertical ports 17, with a horizontal air-flue 18 made in the furnace-bench. This air-flue 18 extends around the furnace bench and discharges through ports 19 into the furnace-eye. It is sub-divided by vertical bricks 20, preferably made with roughened or corrugated sides, and staggered in position, so that the air shall be caused to take an indirect and tortuous path, and shall thus the better take up heat from the bench of the furnace. Each of the four vertical flues B b, C c, &c., is made tortuous in its air-passage by a series of horizontal baffle walls 21, extending from end to end of the flue and having vertical ports d made alternately at the opposite ends. The air which enters each flue through an inlet port 22 at its lower end (Fig. 2) traverses the same in the tortuous path formed by the baffle-walls, and finally enters through the ports 19 in a heated condition into the furnace-eye, where it meets the current of gas from the producer-chambers below; causing the latter to burn thoroughly and to heat the melting-pots.

The operation of the producer in generating gas will be understood by those skilled in the art. The fuel is charged into the chambers 5, 6, through the doors 8, and is ignited on the grate bars 7. The gas is generated by a process of incomplete combustion carried on in the fuel, resulting in the generation of carbonic-oxide gas, and a stream of mingled steam and air is ejected into the producer-chamber by means of valve-controlled steam-pipes 23, discharging into induction nozzles 24 at the mouths of pipes which discharge the steam and induced air through ports 25 into the ash-pits of the producer-chamber. The steam passing through the body of coal is converted by the incandescent portions of the latter into water-gas.

By reason of the location of the producers at the bottom of the well under the eye of the furnace, direct communication of the producers with the melting-chamber of the furnace is had, and no heat is lost. The construction of the compound producer-chamber of oblong form in horizontal sections gives improved results in the generation of gas; and the conjunction of the two chambers, having opposite grate-bars, by causing each chamber to assist the action of the other, accelerates and improves the work. The supporting of the arch of the furnace-well directly upon the producer-arch enables me without sacrificing strength, to put the producer-chamber directly in the furnace-well. Important results are also attained by dividing the horizontal flue 15 by the partition brick 16, as shown in Fig. 5, and the arrangement of the tortuous air-heating flues is also productive of important results.

Without limiting myself strictly to the described form of the parts, I claim as new—

1. A glass-melting furnace having tortuous air flues surrounding the well, said flues connecting with arc-shaped flues beneath the bench, and flues leading from the bench flues into the eye of the furnace; substantially as described.

2. A glass-melting furnace having tortuous air flues surrounding the well, and radial flues leading therefrom to arc-shaped flues beneath the bench, said arc-shaped flues opening into the hollow bottom of the bench; substantially as described.

3. A glass melting furnace having an eye and well, and a gas producer set at the base of the well, with the wall of the latter directly above but supported independently of the producer-arch; substantially as and for the purposes described.

4. A glass-melting furnace having tortuous air-flues surrounding the well, radial flues leading therefrom to arc-shaped flues beneath the bench, said arc-shaped flues opening into the hollow bottom of the bench, and staggered bricks in the hollow bottom; substantially as described.

5. In a glass-melting furnace having a central well, an air-heating flue underlying the bench, air-heating flues in the wall of the well, radial flues leading from the well-flues into lateral flues, a deflector at the mouth of the radial flues, and openings between the lateral flues and the bench flues; substantially as described.

In testimony whereof I have hereunto set my hand this 30th day of August, A. D. 1892.

ADDISON M. BACON.

Witnesses:
   THOMAS W. BAKEWELL,
   W. T. TREDWAY.